(12) United States Patent
Matsuda

(10) Patent No.: US 7,092,066 B2
(45) Date of Patent: Aug. 15, 2006

(54) APPARATUS AND METHOD OF MANUFACTURING LIQUID CRYSTAL DISPLAY

(75) Inventor: Akehiro Matsuda, Tokyo (JP)

(73) Assignee: NEC LCD Technologies, Kanagawa (JP)

( * ) Notice: Subject to any disclaimer, the term of this patent is extended or adjusted under 35 U.S.C. 154(b) by 106 days.

(21) Appl. No.: 10/656,231

(22) Filed: Sep. 8, 2003

(65) Prior Publication Data

US 2004/0046925 A1    Mar. 11, 2004

Related U.S. Application Data

(62) Division of application No. 09/907,603, filed on Jul. 19, 2001, now Pat. No. 6,646,689.

(30) Foreign Application Priority Data

Jul. 19, 2000    (JP)    .............................. 2000-219815

(51) Int. Cl.
*G02F 1/1341*    (2006.01)

(52) U.S. Cl. ...................................... 349/187; 349/190

(58) Field of Classification Search ................ 349/187, 349/190, 158, 189; 430/20, 321; 445/24, 445/25, 64, 67; 156/273.7, 275.3, 275.5, 156/275.7, 285

See application file for complete search history.

(56) References Cited

U.S. PATENT DOCUMENTS

4,923,552 A    5/1990    Fukushima et al.
6,005,653 A    12/1999    Matsuzawa

FOREIGN PATENT DOCUMENTS

| JP | A 11-326857 | 11/1999 |
|---|---|---|
| JP | 2000-66163 | 3/2000 |
| JP | 2000-066163 | * 3/2000 |
| JP | A 2000-147528 | 5/2000 |
| KR | 2000-35483 | 6/2000 |

* cited by examiner

*Primary Examiner*—Dung T. Nguyen
*Assistant Examiner*—Tai Duong
(74) *Attorney, Agent, or Firm*—Young & Thompson

(57) ABSTRACT

An apparatus for manufacturing a liquid crystal display is provided with a first supporter for supporting a first substrate with the state of restraining the displacement in a surface direction of the first substrate on a first surface plate, a second supporter for supporting a second substrate with the state of restraining the displacement in a surface direction of the second substrate on a second surface plate, a pressurized for press-welding the first and second substrates by pressing the first and second surface plates, and a position-aligning mechanism for performing an alignment between the first and second substrates while the pressing means presses the first and second surface plates.

13 Claims, 13 Drawing Sheets

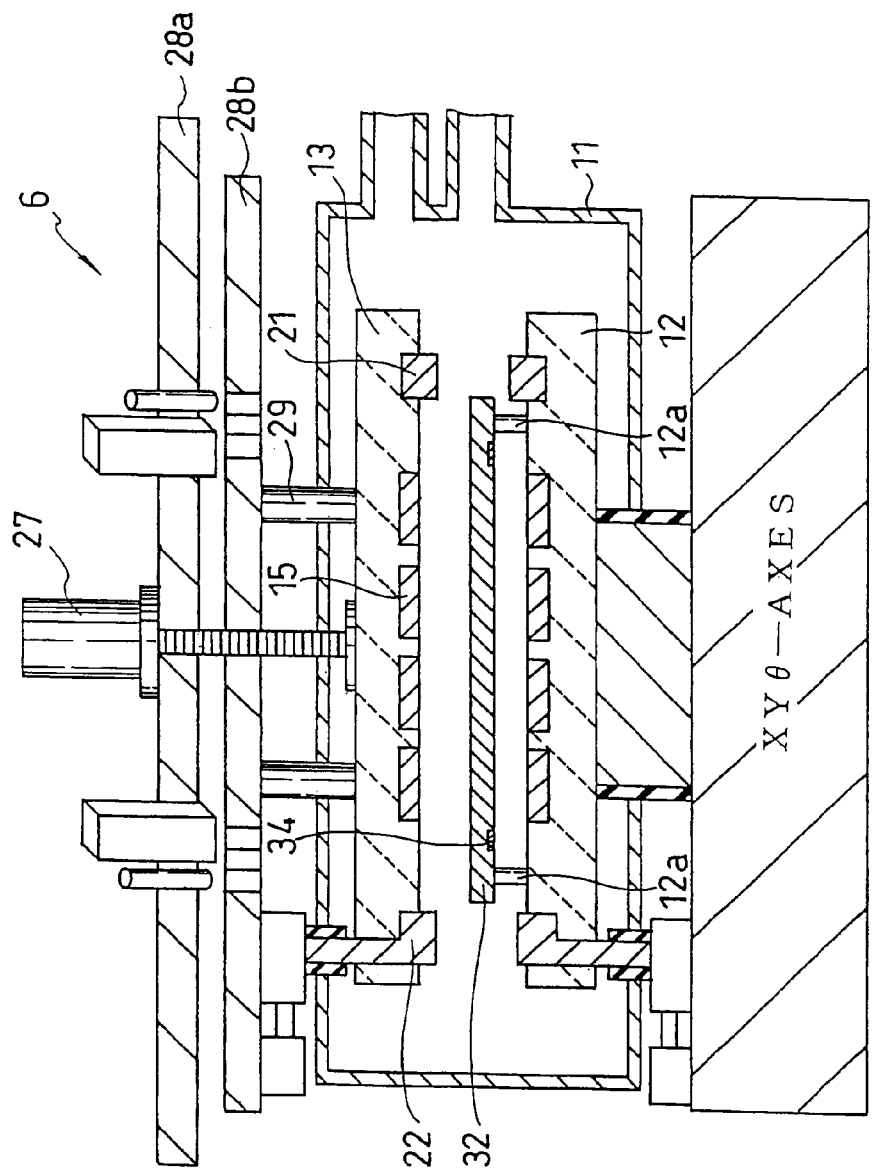

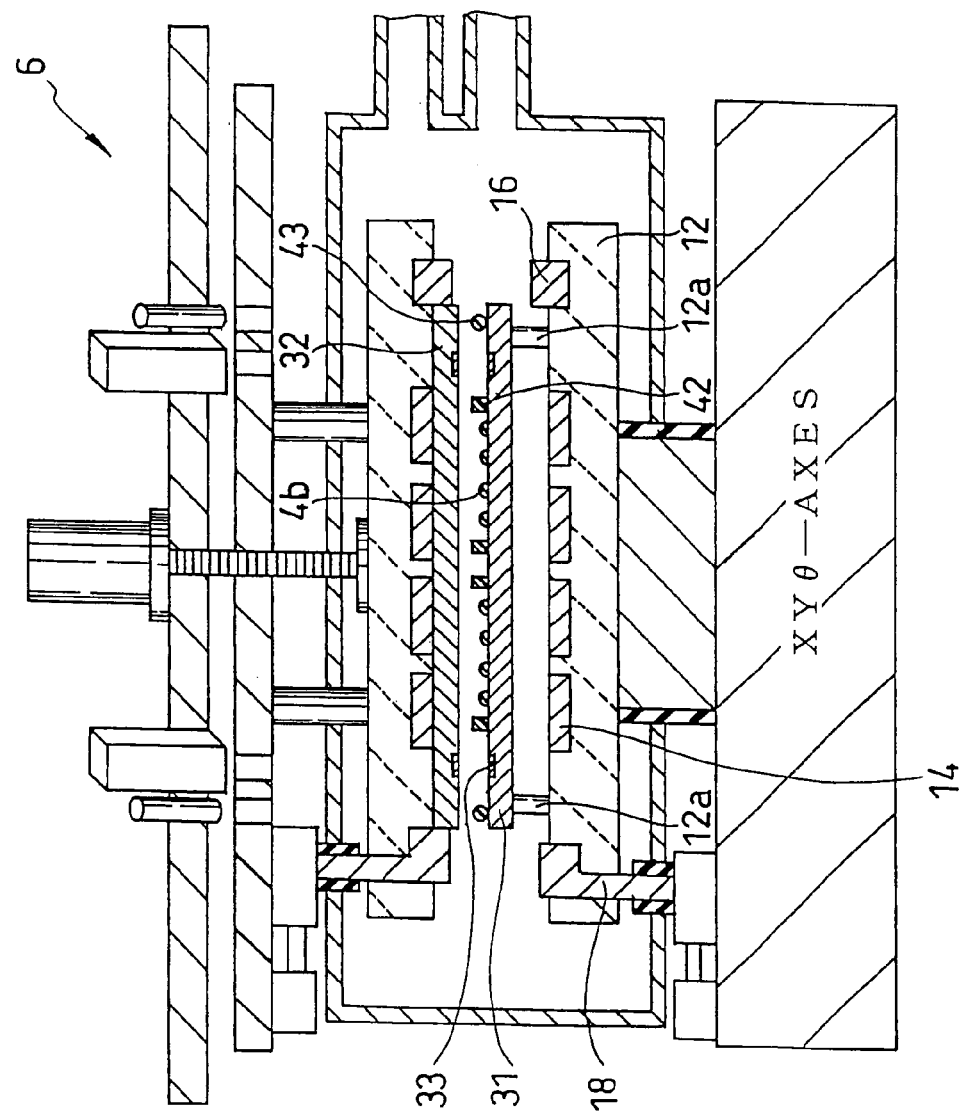

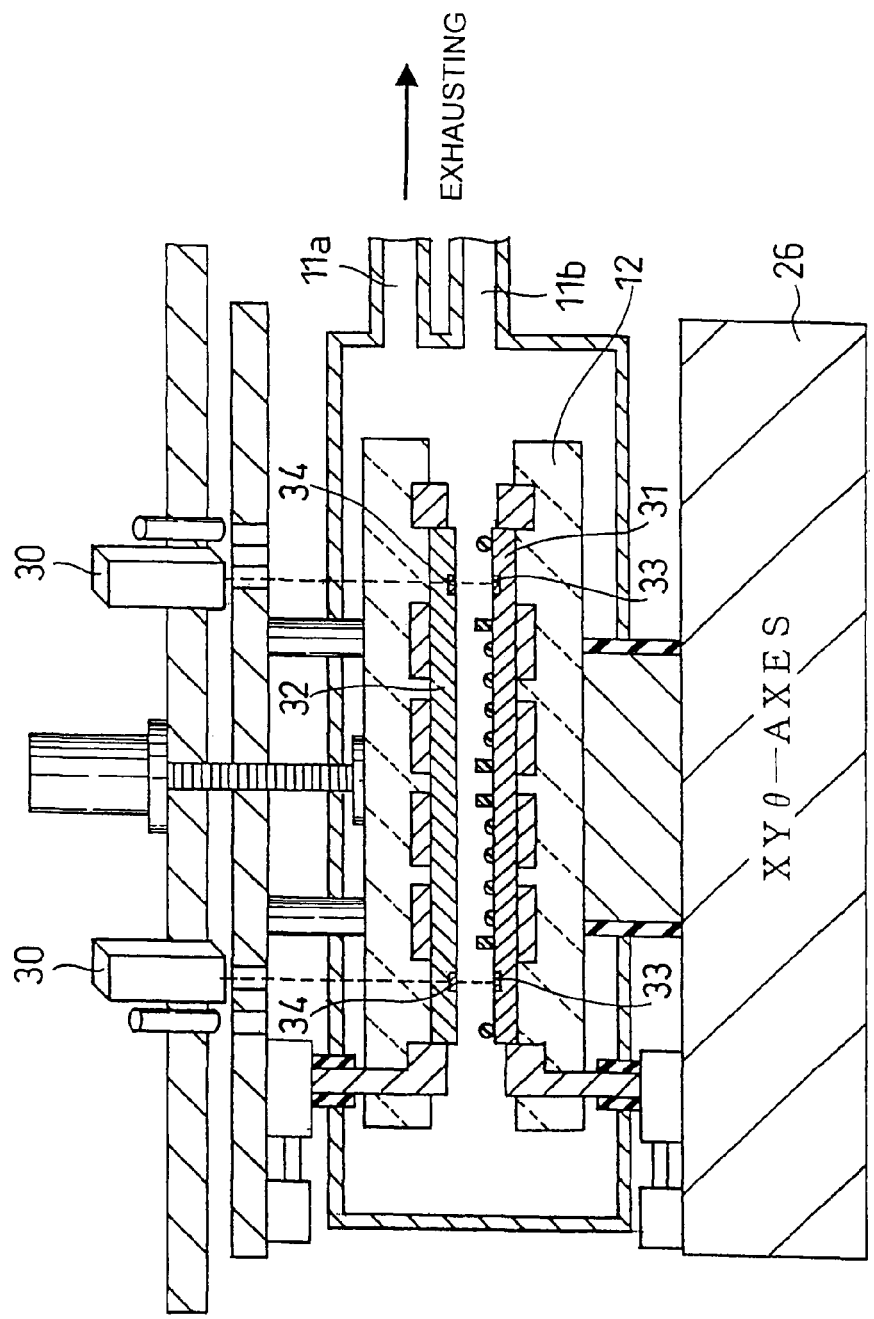

APPARATUS AND METHOD OF MANUFACTURING LIQUID CRYSTAL DISPLAY

This application is a division of co-pending application Ser. No. 09/907,903, filed on Jul. 19, 2001, now U.S. Pat. No. 6,646,689, the entire contents of which are hereby incorporated by reference.

BACKGROUND OF THE INVENTION

1. Field of the Invention

The present invention relates to an apparatus and a method of manufacturing a liquid crystal display by bonding two transparent substrates in a vacuum, and particularly, to an apparatus and a method of manufacturing a liquid crystal display, which makes it possible to easily perform an alignment with high precision in a short time.

2. Description of the Related Art

Conventionally, as a method of manufacturing a liquid crystal display, there has been a method having the steps of forming a sealing material between two substrates and injecting a liquid crystal into the inside thereof as described below. Hereinafter, this manufacturing method is referred to as "a first prior art". FIG. 1 is a flowchart showing the method of manufacturing a liquid crystal display according to the first prior art.

First, two substrates are provided. On one surface of one substrate, a thin film transistor (TFT) is formed in an array shape. Hereinafter, this substrate is referred to as "a TFT substrate". On one surface of the other substrate, a color filter (CF) is formed. Hereinafter, this substrate is referred to as "a CF substrate". Thereafter, an orientation film is formed on both the TFT substrate and the CF substrate (step S1). Next, spacers are formed on the surface of the CF substrate on which the CF is formed (step S2a), and a sealing material having an injection hole in part is formed in a rectangular shape on the surface of the first substrate (the TFT substrate) on which the TFT is formed (step S2b). Thereafter, the surfaces of the second substrate (the CF substrate) and the first substrate on which the CF and the TFT are respectively formed are opposed to each other, and then superposed one on another (step S3). Subsequently, these are heated so that the sealing material formed in the first substrate is burned (step S4).

Thereafter, the superposed first and second substrates are cut and divided into the predetermined number of panels (step S5). Then, a liquid crystal is injected into the inside through the injection hole provided in the sealing material (step S6). Thereafter, the injection hole is sealed (step S7). And then, a cleaning of the panel is performed in order to eliminate contamination made by the liquid crystal injection and the like (step S8). Thereafter, a polarizing plate is attached thereon, and a driving circuit and the like are installed, thereby a liquid crystal display is completed.

However, in the first prior art, there is a problem that there are too many steps.

Therefore, recently, in the standpoint of reducing the number of steps, a manufacturing method having the steps of dropping a liquid crystal in a TFT substrate and bonding the TFT substrate and a CF substrate in a vacuum has been developed and known. Hereinafter, this manufacturing method is referred to as "a second prior art". FIG. 2 is a flowchart showing the method of manufacturing a liquid crystal display according to the second prior art.

First, as in the first prior art, two substrates are provided. After that, an orientation film is formed on both a first substrate (a TFT substrate) and a second substrate (a CF substrate) (step S11). Next, spacers are formed on the surface of the second substrate on which the CF is formed (step S12a), and a sealing material composed of a photo-curable resin is formed in a rectangular shape on the surface of the first substrate on which the TFT is formed (step S12b). Thereafter, a liquid crystal is dropped inside of the sealing material in the first substrate, and the surfaces of the second substrate and the first substrate on which the CF and the TFT are respectively formed are opposed in a vacuum and aligned, and pressed each other, and then the vacuum is ventilated (released to the atmosphere), so that the second substrate and the first substrate are fixed by an atmospheric press (step S13).

Next, the sealing material is irradiated by ultraviolet rays to become a semi-cured state (step S14). Subsequently, the sealing material is heated to be thermally cured (step S15). Then, the bonded first and second substrates are cut and divided into the predetermined number of panels (step S16). Thereafter, a polarizing plate is attached thereon, and a driving circuit and the like are installed, thereby a liquid crystal display is completed.

FIG. 3 is a cross sectional view showing the structure of an apparatus for manufacturing a liquid crystal display used in the second prior art.

In the conventional apparatus for manufacturing a liquid crystal display, there is provided with a vacuum chamber 111, and a first surface plate 112 and a second surface plate 113 are provided within the vacuum chamber 111 in parallel to each other. In the vacuum chamber 111, there are provided with a vacuum suction opening 111a and a vacuum exhaust opening 111b. The material for the first surface plate 112 is, for example, ceramics, and an electrode (the first substrate sucker) 114 for electrostatic suction of a first substrate 131 is padded in the surface opposite to the second surface plate 113. Likewise, the material for the second surface plate 113 is, for example, ceramics, and an electrode (the second substrate sucker) 115 for electrostatic suction of a second substrate 132 is padded in the surface opposite to the first surface plate 112. Also, in each of the first surface plate 112 and the second surface plate 113, inhalation holes (not shown) and the like for vacuum suction of the first substrate 131 and the second substrate 132 are provided.

Furthermore, the lower surface of the first surface plate 112 is connected to the upper end of a first surface plate-connecting pedestal 125, and the lower end of the first surface plate-connecting pedestal 125 is connected to a position-adjusting table 126. On the position-adjusting table 126, there is provided with a motor (not shown), which enables the first surface plate-connecting pedestal 125 to move straight in two directions perpendicular to each other (X direction and Y direction) and to rotate in a circumferential direction (θ direction) having the central axis as a rotating axis. Therefore, the position of the first surface plate 112 and the first substrate 131 is adjusted by the position-adjusting table 126.

Further, there is provided with a pressing motor 127, which moves the second surface plate 113 in a vertical direction to press the second surface plate 113 and the first surface plate 112 each other. The pressing motor 127 is fixed to a fixing member 128a. Also, outside of the vacuum chamber 111, there are provided with an alignment camera 130 for detecting positions of alignment marks 133 and 134 respectively provided in the first substrate 131 and the second substrate 132, and an ultraviolet rays source 135 irradiating ultraviolet rays to a photo-curable resin 143 for tacking applied between the substrates. Also, a second surface plate-supporting member 129, which supports the second surface plate 113 against the first surface plate 112 in parallel, is supported to a fixing member 128b.

In addition, in the second prior art, although the CF substrate and the TFT substrate are pressed with superposed state in a vacuum, an alignment between the second substrate 132 (the CF substrate) and the first substrate 131 (the TFT substrate) is performed before being pressed. At this time, the gap between the second substrate and the first substrate is from about 0.2 to 0.5 mm. Further, the gap between the CF substrate and the TFT substrate, after being pressed by atmosphere (referred to as "an atmospheric press"), is about 5 µm.

According to the second prior art, in comparison to the first prior art, there are advantages that the number of steps can be reduced, and because there is no process step of injecting a liquid crystal followed by superposing the substrates, the contamination therefrom can be prevented, and the material for sealing a hole thereafter is not needed.

Also, Japanese Patent Laid-Open No. 2000-66163 publication discloses a substrate-bonding apparatus, which bonds two substrates in a vacuum chamber by pressing the surface plates while checking the position of a mark using a recognition camera with the state of sucking the substrates to the surface plates by an electrostatic chuck.

However, in the second prior art, since the alignment is performed between the alignment marks provided in each of the substrate before pressing the surface plates, there is a problem that misalignment occurred by later pressurization needs to be corrected.

Also, in the substrate-bonding apparatus described in Japanese Patent Laid-Open No. 2000-66163 Publication, although the alignment is performed by fixing the substrates to the surface plates by the electrostatic suction, if the alignment is performed during the press, thrust is exerted in the direction parallel to a surface of the substrate, and if this thrust exceeds friction force having electrostatic suction and pressurizing force as drag, the position of the substrates is displaced. Therefore, it becomes necessary to precisely correct the misalignment plural times, and the number of steps increases. Further, in the worst case, there is a problem that the correction itself cannot be performed.

SUMMARY OF THE INVENTION

The object of this invention is to provide an apparatus and a method of manufacturing a liquid crystal display, which makes it possible to easily perform an alignment of two substrates with high alignment precision in a short time.

According to one aspect of the present invention, an apparatus for manufacturing a liquid crystal display constituted by bonding a first substrate and a second substrate disposed opposite to each other with a liquid crystal intervened between them, the apparatus comprises first and second surface plates having first and second substrate suckers disposed in parallel to each other. Each of the first and second substrate sucker sucks the first and second substrates, respectively. The apparatus further comprises: a vacuum chamber in which the first and second surface plates are provided; a first supporter which supports the first substrate with the state of restraining the displacement in a surface direction of the first substrate on the first surface plate; a second supporter which supports the second substrate with the state of restraining the displacement in a surface direction of the second substrate on the second surface plate; a pressurizer for press-welding the first and second substrates by pressing the first and second surface plates; and a position-aligning mechanism which performs an alignment between the first and second substrates while the pressurizer presses the first and second surface plates.

In the present invention, there are provided with the suckers for sucking the substrates to the surface plates, and supporters for supporting the substrates with the state of restraining the displacement in a surface direction of substrates on the surface plates, and a position-aligning mechanism for performing an alignment between the substrates while being pressed by the surface plates.

Thereby, although great force is applied from the pressurizer during the alignment, it is prevented that the substrates are displaced from the surface plates during the alignment because the first and second substrates are restrained in the direction parallel to the surface by the first and second supporters.

Moreover, in the vacuum chamber, the alignment between the first substrate and the second substrate is performed by the position-aligning mechanism in the state that a predetermined pressure is applied between the first surface plate and the second surface plate. Thereby, the misalignment between the first substrate and the second substrate does not occur although the press by the pressurizer is released.

In addition, by releasing the vacuum, since both substrates are subject to the press by atmospheric pressure (atmospheric press) as the state that an alignment is performed, very high precision is maintained. As a result, it becomes possible to perform the alignment with much ease and with high precision in a short time.

In case where each of the first and second substrates is electro-statically sucked to the first and second surface plates by the substrate sucker, it becomes possible to suck the substrates firmly even under low pressure in the vacuum chamber.

The first supporter may comprise: a first fixing member fixed on a surface of the first surface plate on which the first substrate sucker is provided, and having a plane vertical to the surface; a second fixing member fixed on a surface of the first surface plate on which the first substrate sucker is provided, and having a plane vertical to the surface of the first surface plate and the plane of the first fixing member; and a first squeezing mechanism which squeezes each of two sides of the first substrate perpendicular to each other on each of the planes of the first and second fixing mechanism. The second supporter may comprise: a third fixing member fixed on a surface of the second surface plate on which the second substrate sucker is provided, and having a plane vertical to the surface; a fourth fixing member fixed on a surface of the second surface plate on which the second substrate sucker is provided, and having a plane vertical to the surface of the second surface plate and the plane of the third fixing mechanism; and a second squeezing mechanism which squeezes each of two sides of the second substrate perpendicular to each other on each of the planes of the third and fourth fixing mechanism. In this case, the first and second squeezing mechanism may tightly squeeze two sides of the substrate on two fixing members in one direction, respectively, however, it is preferred to tightly squeeze them in two directions vertical to each of the planes of the fixing members because it is possible to more tightly squeeze the substrates on the fixing means.

According to another aspect of the present invention, an apparatus for manufacturing a liquid crystal display constituted by bonding a first substrate and a second substrate disposed opposite to each other with a liquid crystal intervened between them, the apparatus comprises: a liquid crystal dropping unit which drops a liquid crystal on the first substrate; a resin applying unit which applies a photo-curable resin on the first substrate; first and second surface plates having first and second electrostatic suckers disposed in parallel to each other. Each of the first and second electrostatic suckers sucks the first and second substrates, respectively. The apparatus further comprises: a vacuum chamber in which the first and second surface plates are provided; a first supporter which supports the first substrate with the state of restraining the displacement in a surface direction of the first substrate on the first surface plate; a second supporter which supports the second substrate with the state of restraining the displacement in a surface direction of the second substrate on the second surface plate; a pressurizer for press-welding the first and second substrates by pressing the first and second surface plates; a position-adjusting table for performing an alignment between the first and second substrates by sliding the first surface plate in two axial directions parallel to the surface of the first surface plate and in a circumferential direction having an axis vertical to the surface of the first surface plate as a rotating axis, while the pressurizer presses the first and second surface plates; and an ultraviolet irradiator which irradiates ultraviolet rays to the photo-curable resin in the state that the first and second substrates are press-welded.

Also, in this apparatus for manufacturing a liquid crystal display, although great force is applied from the pressurizer, it is prevented that the substrates are displaced from the surface plates during the alignment. Therefore, although the press by the pressurizer is released later, the misalignment between the first substrate and the second substrate does not occur, and very high precision is maintained. As a result, it becomes possible to perform the alignment with much ease and with high precision in a short time.

According to further another aspect of the present invention, a method of manufacturing a liquid crystal display constituted by bonding first and second substrates, the method comprises the steps of: dropping a liquid crystal on the first substrate; performing an alignment between the first and second substrates while pressing the second substrate on a surface of the first substrate on which the liquid crystal is dropped with a predetermined pressure in a vacuum chamber where the internal pressure is below a predetermined value; and releasing the vacuum chamber into atmospheric pressure.

According to further another aspect of the present invention, a method of manufacturing a liquid crystal display constituted by bonding first and second substrates, the method comprises the steps of: dropping a liquid crystal on the first substrate; applying a photo-curable resin on the first substrate; performing an alignment between the first and second substrates by sliding the first substrate in two axial directions parallel to the surface and in a circumferential direction having an axis vertical to the surface as a rotating axis, in a vacuum chamber where the internal pressure is below a predetermined value, while pressing the second substrate on a surface of the first substrate on which the liquid crystal is dropped with a predetermined pressure; irradiating ultraviolet rays to the photo-curable resin in the state that the first and second substrates are press-welded; and releasing the vacuum chamber into atmospheric pressure.

According to the methods of the present invention, in a vacuum chamber where the internal pressure is below a predetermined value, because the alignment between the first substrate and the second substrate is performed by being pressed, it is prevented that the substrates are displaced from the surface plates during the alignment although great force is applied to the substrates from the pressurizer. Therefore, although the press by the pressurizer is released later, the misalignment between the first substrate and the second substrate does not occur. In addition, by releasing the vacuum, because both substrates are subject to the press by atmospheric pressure (atmospheric press) as the state that the alignment is performed, very high precision is maintained. As a result, it becomes possible to perform the alignment with much ease and with high precision in a short time.

According to the present invention, because the substrates are subject to the atmospheric press by opening the vacuum chamber as the state that the alignment is performed, very high precision can be maintained. As a result, inconsistencies of display and color can be reduced. Also, comparing to the conventional method to inject a liquid crystal between substrates from a liquid crystal injection hole formed in a sealing material, contamination during the injection of liquid crystal can be prevented, and further, the number of processes can be reduced.

BRIEF DESCRIPTION OF THE DRAWINGS

FIG. 7 is a schematic view showing the operation of the apparatus for manufacturing a liquid crystal display according to the embodiment of present invention;

FIG. 9 shows the next operation of the operation shown in FIGS. 8A and 8B;

FIG. 10 shows the next operation of the operation shown in FIG. 9;

DETAILED DESCRIPTION OF THE PREFERRED EMBODIMENTS

Figure 1:
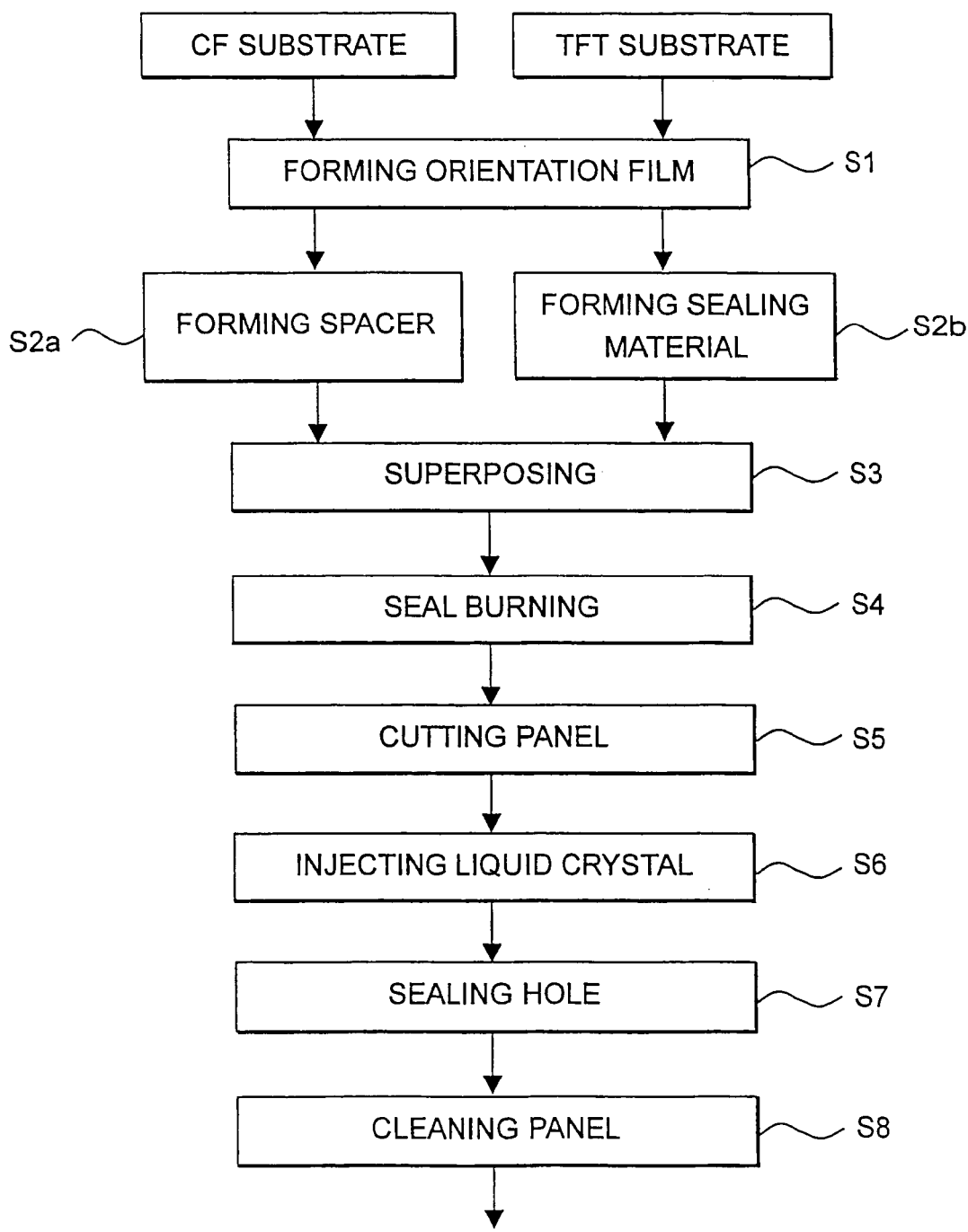
FIG. 1 is a flowchart showing a method of manufacturing a liquid crystal display according to the first prior art.
Figure 2:
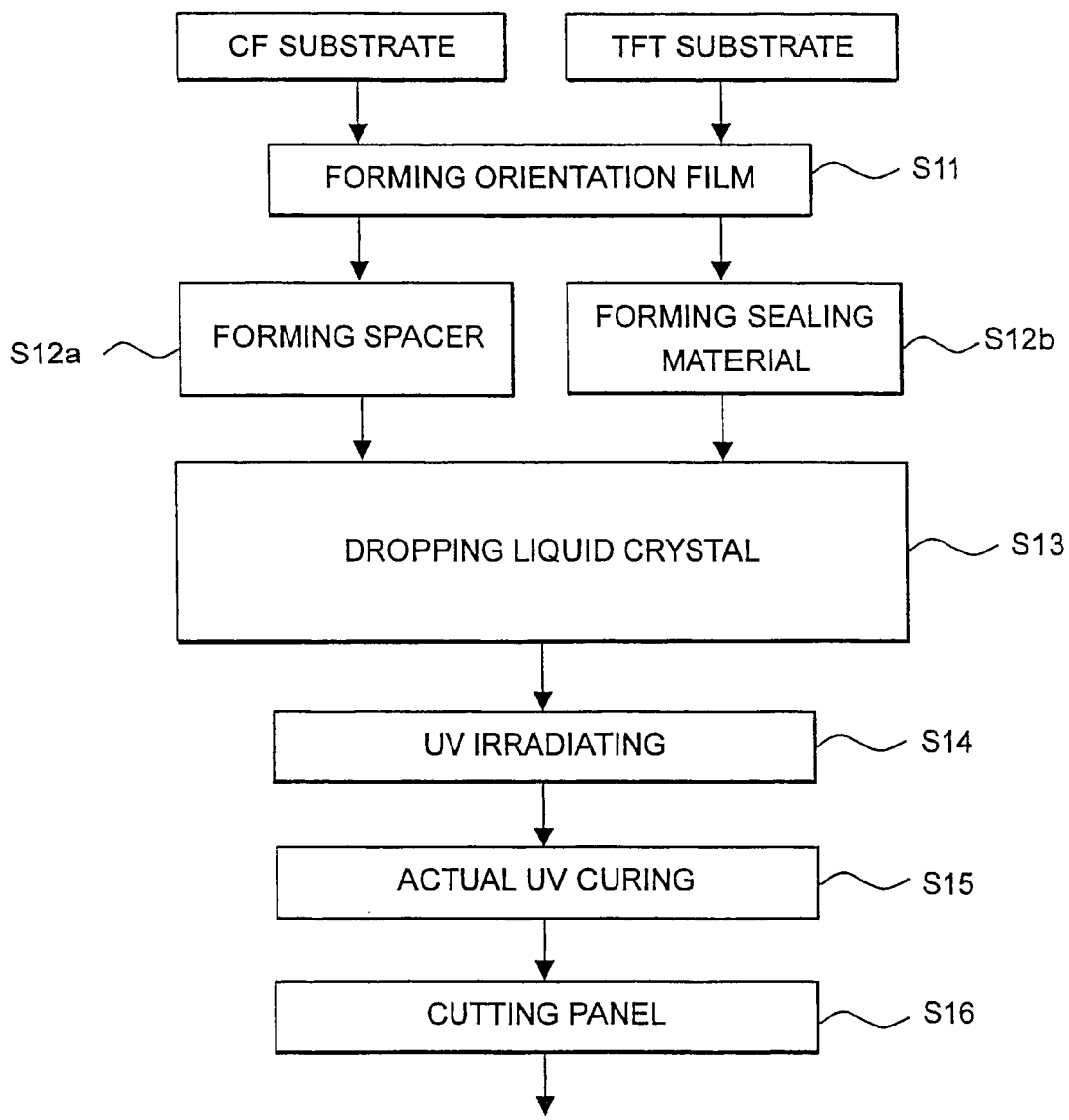
FIG. 2 is a flowchart showing a method of manufacturing a liquid crystal display according to the second prior art.
Figure 3:
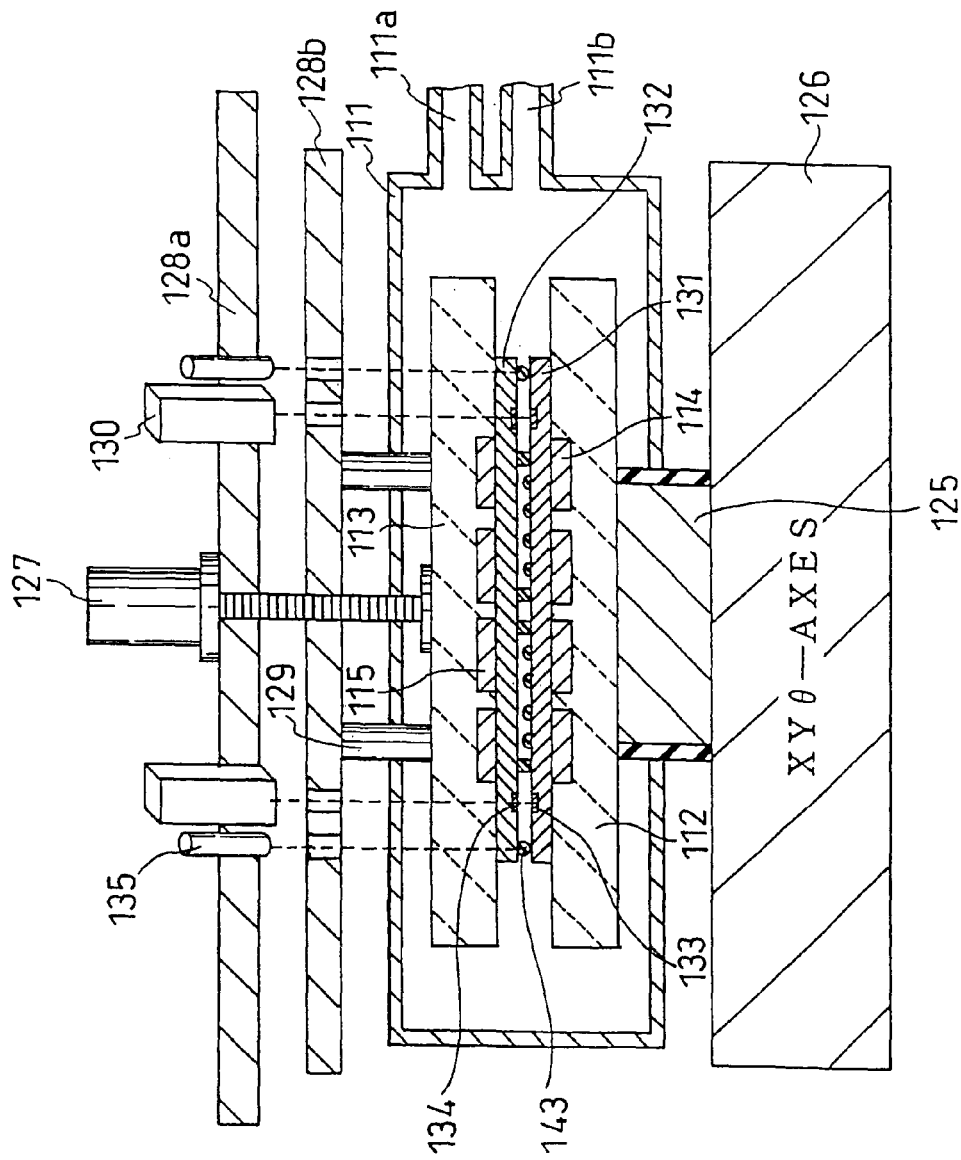
FIG. 3 is a cross sectional view showing the structure of an apparatus for manufacturing a liquid crystal display used in the second prior art.
Figure 4:
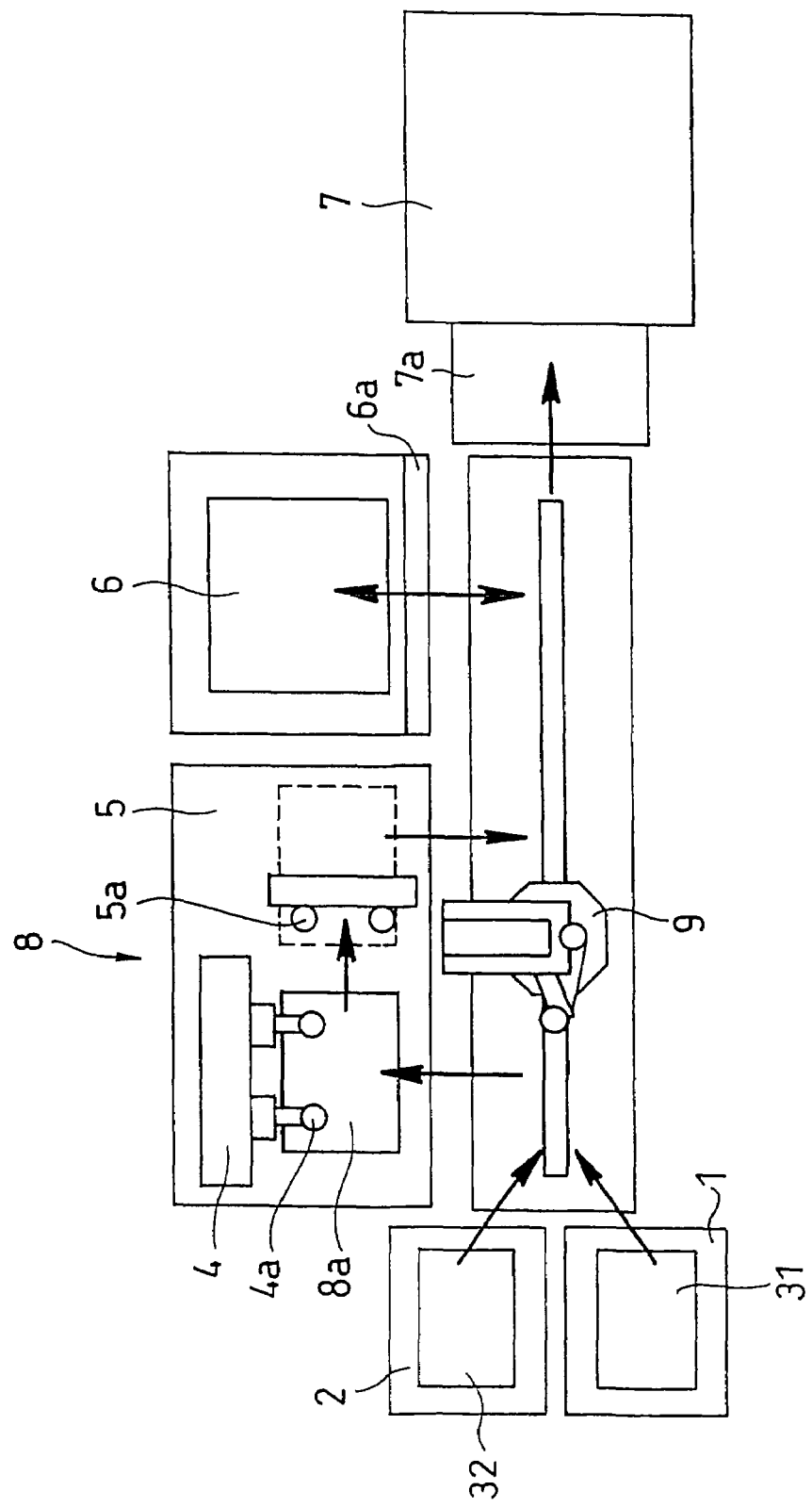
FIG. 4 is a top view schematically showing the structure of an apparatus for manufacturing a liquid crystal display according to an embodiment of the present invention.

Hereinafter, a preferred embodiment of the present invention will be described in detail with reference to the accompanying drawings. FIG. 4 is a top view schematically showing the structure of an apparatus for manufacturing a liquid crystal display according to an embodiment of present invention.

In the manufacturing apparatus relating to the present embodiment, there are provided with a first loading unit 1, on which a first substrate 31 is loaded, and a second loading unit 2, on which a second substrate 32 is loaded. The first substrate 31 and the second substrate 32 are, for example, a TFT substrate and a CF substrate, respectively, but not limited to them, and it is possible that one of the substrates is a CF-on-TFT substrate and the other thereof has a common electrode. Herein, the CF-on-TFT substrate means that a TFT is arranged on one transparent substrate in an array shape and a CF is further formed on the TFT. Also, both the first substrate 31 and the second substrate 32 are loaded in the state that electrodes and the like are formed on a transparent substrate. In addition, there are provided with a liquid crystal dropping unit 4 for dropping a liquid crystal on the first substrate 31, a resin applying unit 5 for applying a photo-curable resin on the first substrate 31, and a processing unit 6 for bonding the first substrate 31 and the second substrate 32. In the liquid crystal dropping unit 4, there is provided with a dispenser for liquid crystal 4a, and in the resin applying unit 5, there is provided with a dispenser for resin 5a. Further, there is provided with an UV irradiating unit 7 for irradiating ultraviolet rays to a panel of which the bonding is completed to further cure a photocurable resin.

In addition, there is provided with a substrate-carrying robot 9 for moving the first substrate 31 and the second substrate 32 among the loading parts 1 and 2, the liquid crystal dropping unit 4, the resin applying unit 5, the processing unit 6, and the UV irradiating unit 7.

Also, a liquid crystal dropping/resin applying unit 8 is constituted by the liquid crystal dropping unit 4 and the resin applying unit 5, and in the liquid crystal dropping/resin applying unit 8, there is provided with a stage 8a, which moves between the liquid crystal dropping unit 4 and the resin applying unit 5 with the first substrate 31 loaded thereon.

Furthermore, a shutter 6a is provided in the substrate-carrying robot 9 side of the processing unit 6, and a shutter 7a is provided in the substrate-carrying robot 9 side of the UV irradiating unit 7. Both shutters 6a and 7a are opened when taking in and out the substrate 31 or 32.

Figure 5:
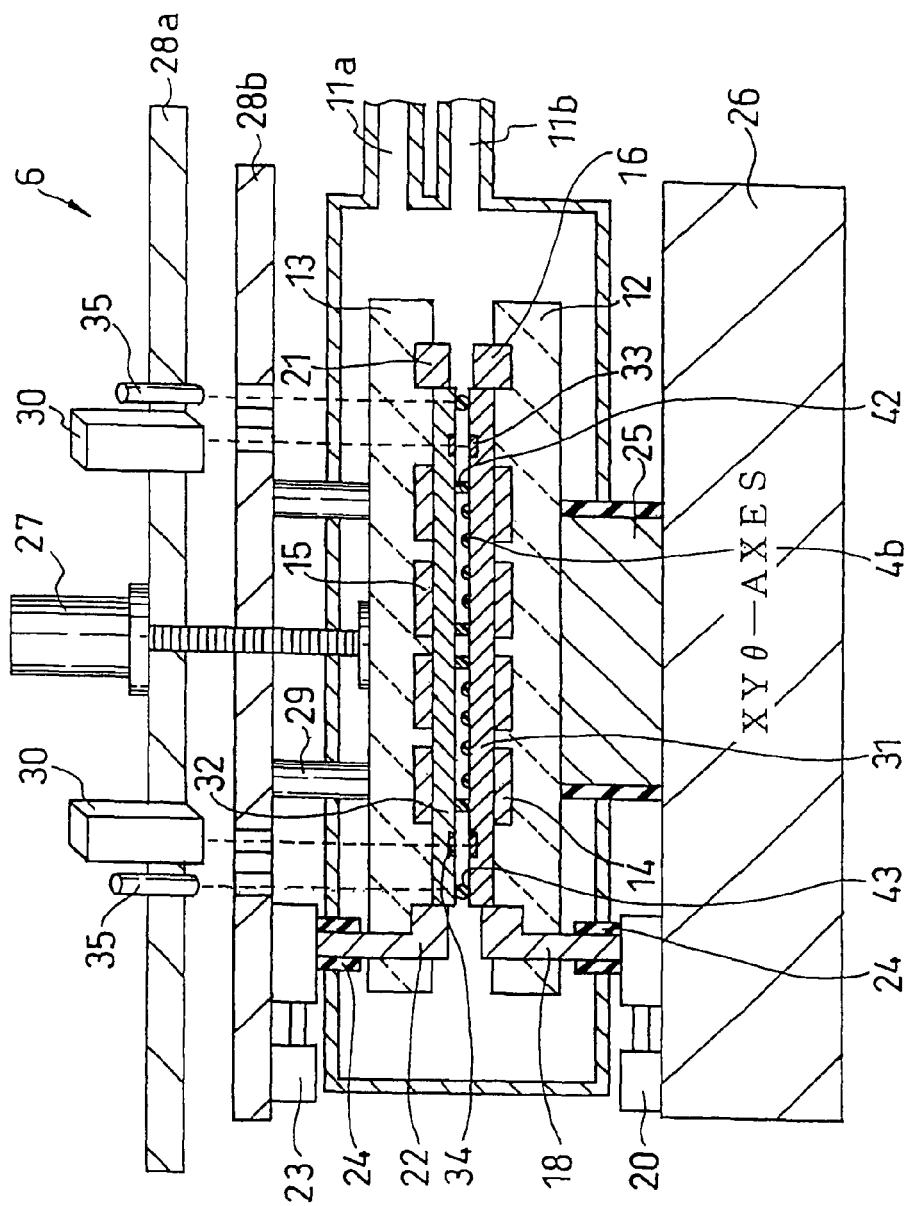
FIG. 5 is a cross sectional view showing the structure of a processing unit 6.

FIG. 5 is a cross sectional view showing the structure of the processing unit 6. In the processing unit 6, there is provided with a vacuum chamber 11, and a first surface plate 12 and a second surface plate 13 are provided in the vacuum chamber 11 in parallel to each other. In the vacuum chamber 11, a vacuum suction opening 11a and a vacuum exhaust opening 11b are provided. The material for the first surface plate 12 is, for example, ceramics, and an electrode (the first substrate sucker) 14 for electrostatic suction of the first substrate 31 is padded in the surface opposite to the second surface plate 13. Likewise, the material for the second surface plate 13 is, for example, ceramics, and an electrode (the second substrate sucker) 15 for electrostatic suction of the second substrate 32 is padded in the surface opposite to the first surface plate 12. Also, in the first surface plate 12 and the second surface plate 13, inhalation holes (not shown), which are for vacuum suction of the first substrate 31 and the second substrate 32, and the like are provided.

Figure 6:
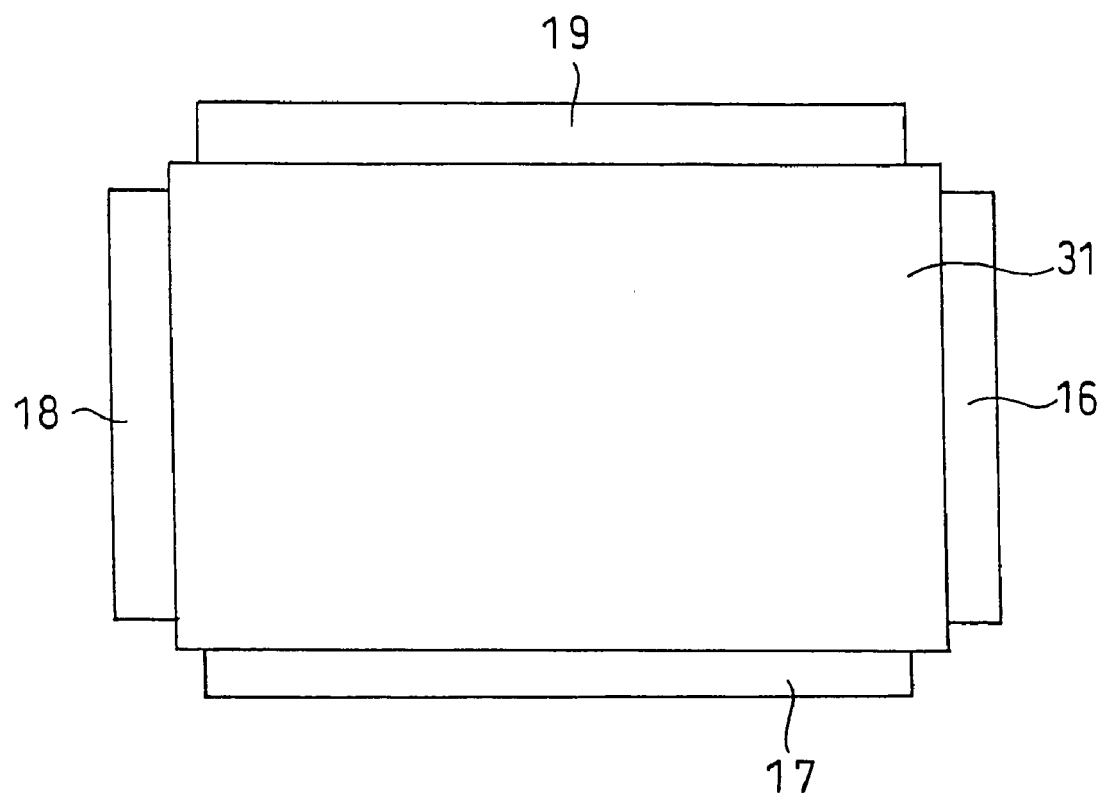
FIG. 6 is a schematic view showing a first surface plate 12 in the state that a first substrate 31 is sucked thereto.

FIG. 6 is a schematic view showing the first surface plate 12 in the state that the first substrate 31 is sucked thereto. On the surface of the first surface plate 12 opposite to the second surface plate 13, first and second fixing guides (first and second fixing members) 16 and 17 in which planes vertical to the opposite surfaces are formed are fixed. The first and second fixing guides 16 and 17 are arranged to be extended perpendicularly to each other, and both planes are also perpendicular to each other. In addition, there are provided with a pusher guide 18 for tightly squeezing the first substrate 31 on the first fixing guide 16 and a pusher guide 19 for tightly squeezing the first substrate 31 on the second fixing guide 17. As shown in FIG. 5, a driving unit 20 is connected to the pusher guide 18. Likewise, a driving unit (not shown) is also connected to the pusher guide 19. And, a first squeezing mechanism is constituted by the pusher guides and the driving units.

Similarly, on the surface of the second surface plate 13 opposite to the first surface plate 12, a third fixing guide (a third fixing member) 21 and a fourth fixing guide (a fourth fixing member) (not shown) in which planes vertical to the opposite surfaces are formed are fixed. In addition, there are provided with a pusher guide 22 for tightly squeezing the second substrate 32 on the third fixing guide 21 and a pusher guide (not shown) for tightly squeezing the second substrate 32 on the fourth fixing guide. A driving unit 23 is connected to the pusher guide 22. Likewise, a driving unit (not shown) is also connected to the other pusher guide. And, a second squeezing mechanism is constituted by the pusher guides and the driving units. Further, in the upper and lower portions of the vacuum chamber 11, bellows 24 are provided, and the pusher guide 18 and the like are inserted through the bellows 24.

Furthermore, the lower surface of the first surface plate 12 is connected to the upper end of a first surface plate-connecting pedestal 25, and the lower end of the first surface plate-connecting pedestal 25 is connected to a position-adjusting table 26. On the position-adjusting table 26, the driving unit 20 and the like provided on the first surface plate 12 side of the vacuum chamber 11 are also fixed. On the position-adjusting table 26, there is provided with a motor (not shown), which enables the first surface plate-connecting pedestal 25 to move straight in two directions perpendicular to each other (X direction and Y direction) and further to rotate in a circumferential direction (θ direction) by having the central axis as a rotating axis. Therefore, the position of the first surface plate 12 and the first substrate 31 is adjusted by the position-adjusting table 26.

Further, there is provided with a pressing motor 27, which moves the second surface plate 13 in the vertical direction to press the second surface plate 13 and the first surface plate 12 each other. The pressing motor 27 is fixed to a fixing member 28a. Also, outside of the vacuum chamber 11, there are provided with an alignment camera 30 for detecting position of alignment marks 33 and 34 respectively provided in the first substrate 31 and the second substrate 32, and an ultraviolet rays source 35 irradiating ultraviolet rays to the photo-curable resin for tacking applied with the substrates.

Also, there is provided with a fixing member 28b for fixing the driving unit 23 provided on the second surface plate 13 side of the vacuum chamber 11, and a second surface plate-supporting member 29, which supports the second surface plate 13 against the first surface plate 12 in parallel, is supported to the fixing member 28b.

Further, although not being shown in FIGS. 5 and 6, a pushing-up pin, which protrudes from the surface of the first surface plate to the second surface plate 13 side and supports the substrates 31 and 32, is provided in the first surface plate 12.

Next, the operation of the apparatus for manufacturing a crystal display device constituted as described above according to the present embodiment, namely, the method of manufacturing a liquid crystal display using the manufacturing apparatus will be described. FIGS. 7 through 12 are schematic views showing the operation of the apparatus for manufacturing a liquid crystal display according to the embodiment of the present invention in the order.

First, the substrate-carrying robot 9 picks up the second substrate 32 from the second loading unit 2 and reverses the upper and lower surfaces. Therefore, electrodes and the like provided in the second substrate 32 are positioned in the lower part side. Next, as shown in FIG. 7, the shutter 6a of the processing unit 6 is opened, and the pushing-up pin 12a is protruded, and the second substrate 32 is loaded on the pushing-up pin 12a. Subsequently, the pressing motor 27 is activated to lower the second surface plate 13 up to the height that the second surface plate 13 can suck the second substrate 32. Further, position determination and fixing of the second substrate 32 are performed by the pusher guides 22 and the like, and the second substrate 32 is sucked by the second surface plate 13.

Figure 8A:
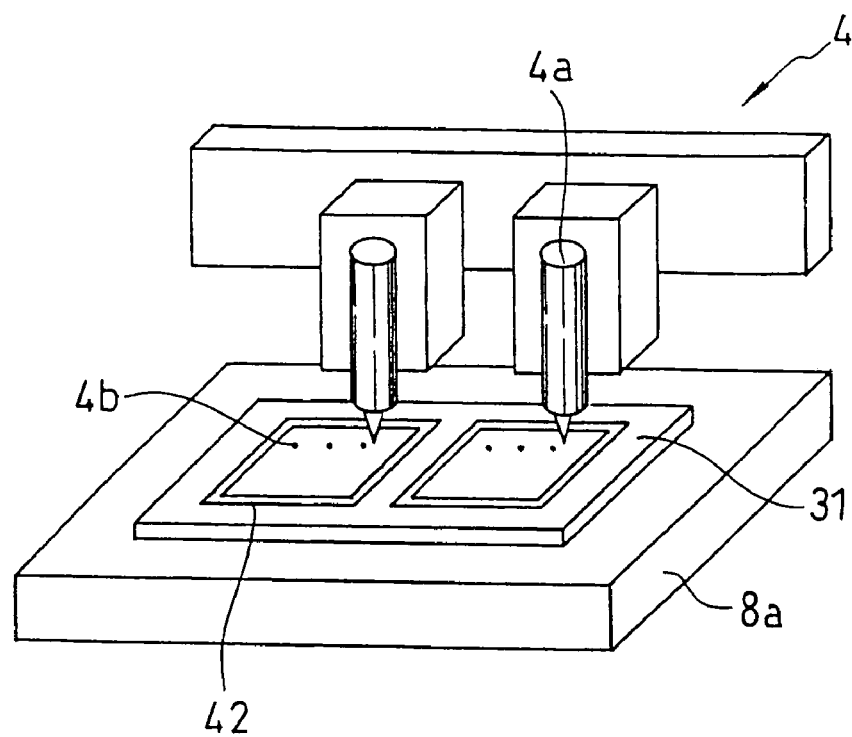
FIGS. 8A and 8B show the next operation of the operation shown in FIG. 7.

Next, the substrate-carrying robot 9 picks up the first substrate 31 from the first loading unit 1, and transfers it on the stage 8a of the liquid crystal dropping unit 4. On the loaded first substrate 31, as shown in FIG. 8A, a sealing material 42 is applied. The sealing material 42 is that, for example, a gapping material having particles of about 5 μm in diameter is dispersed in the photo-curable resin. Also, the width of the sealing material 42 is, for example, about 1 mm. In FIG. 8A, although the sealing material 42 is applied in a rectangular shape in two parts for cutting the first substrate 31 into two TFT substrates, for example, in case of cutting the first substrate 31 into four TFT substrates, the sealing material is applied in a rectangular shape in four parts. Further, a viscosity of the sealing material 42 is, for example, hundreds of thousands cP, but not limited to it.

Figure 8B:
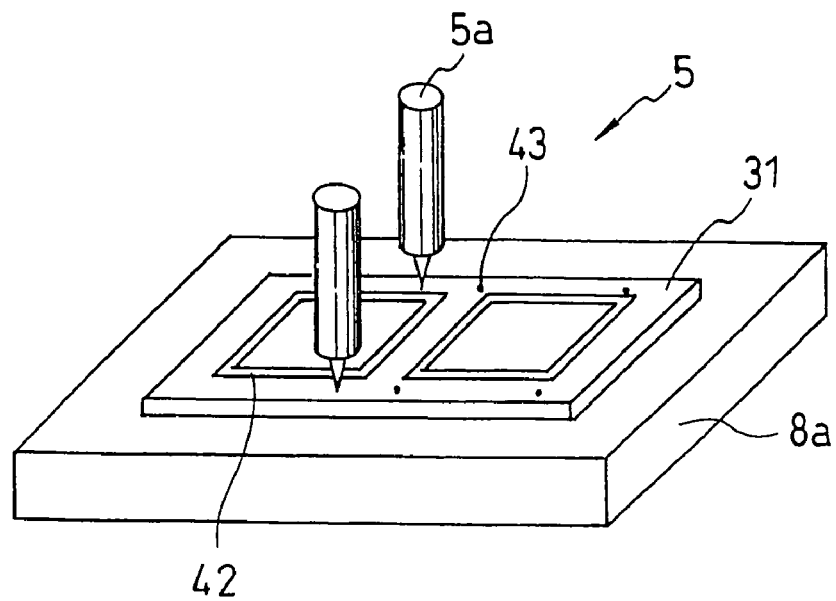
Figure 13:
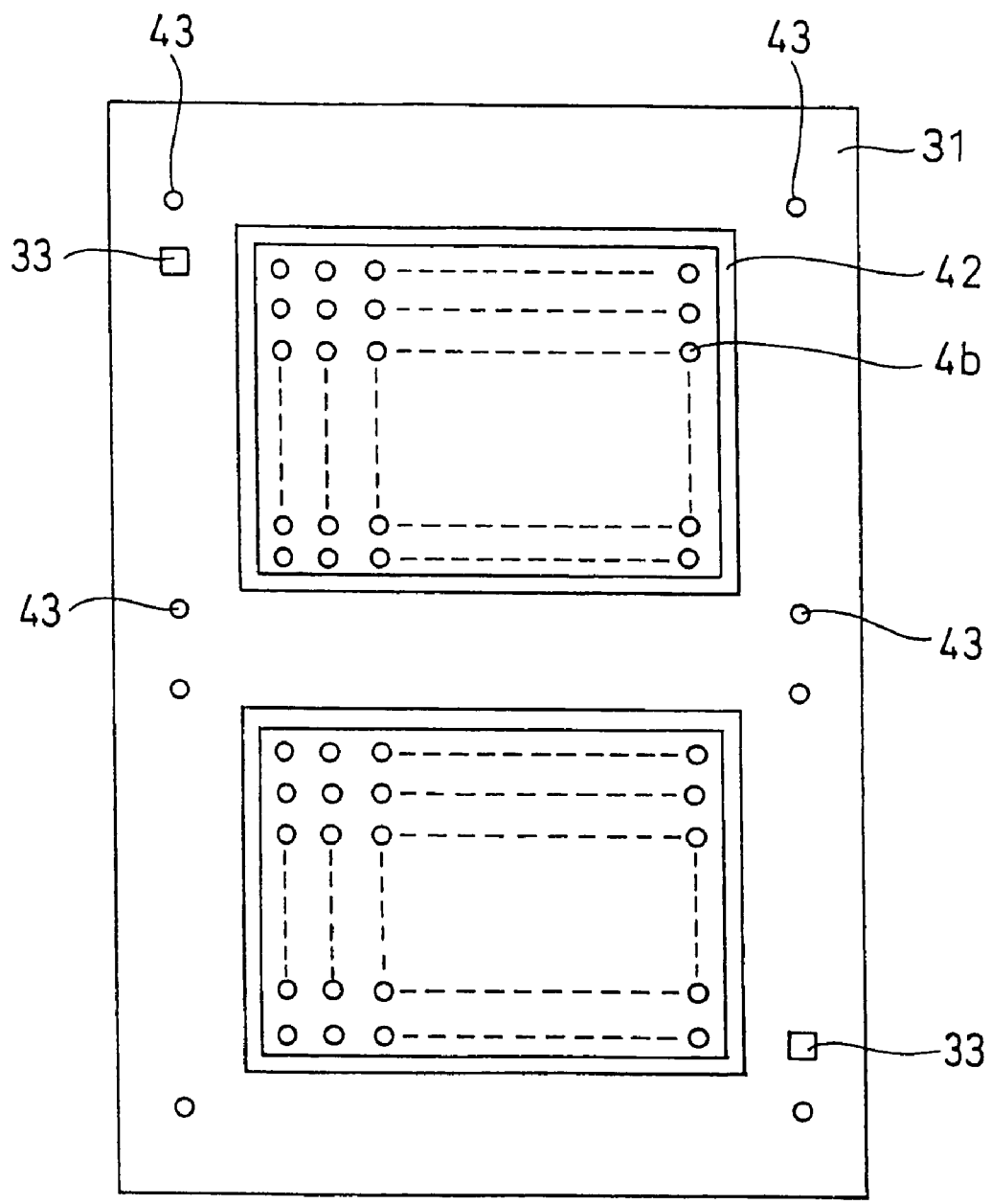
FIG. 13 is a schematic view showing the positions for dropping a liquid crystal and applying a photo-curable resin.

And, after transferring the first substrate 31, a liquid crystal 4b is dropped by the dispenser 4a within the area surrounded by the sealing material 42. FIG. 13 is a schematic view showing positions for dropping a liquid crystal and applying a photo-curable resin. As shown in FIG. 13, the liquid crystal 4b may be either dispersed with the small amount within a predetermined quantity or dropped with somewhat large amount in the center portion. Thereafter, the first substrate 31 is transferred to the resin applying unit 5 by the stage 8a provided in the liquid crystal dropping/resin applying unit 8. Then, as shown in FIG. 8B, a photo-curable resin 43 is applied on the first substrate 31 by the dispenser 5a. At this time, the photo-curable resin 43 may be applied every one place around four corners of the sealing material 42 as shown in FIG. 13, but is not limited to it.

Next, the first substrate 31 is transferred to the processing unit 6 by the substrate-carrying robot 9, and as shown in FIG. 9, the first substrate 31 is loaded on the pushing-up pin 12a in the processing unit 6, and the shutter 6a is closed. Subsequently, the pushing-up pin 12a is lowered, position determination and fixing of the first substrate 31 are performed by the pusher guides 18 and 19, and the like, and the first substrate 31 is sucked by the first surface plate 12.

Thereafter, a vacuum suction is performed in the vacuum chamber 11 from the vacuum suction opening 11a. And, after the internal pressure of the vacuum chamber 11 reaches a predetermined pressure, while the vacuum suction is performed in the vacuum suction opening 11a for maintaining the inside of the vacuum chamber 11 below the predetermined pressure, the position of the first surface plate 12 is adjusted by the position-adjusting table 26, as shown in FIG. 10 such that the misalignment of the first substrate 31 and the second substrate 32 is, for example, within 5 μm, with having the gap between the two substrates, for example, from about 0.2 to about 0.5 mm, while detecting the positions of the alignment marks 33 and 34 by the alignment camera 30.

Figure 11:
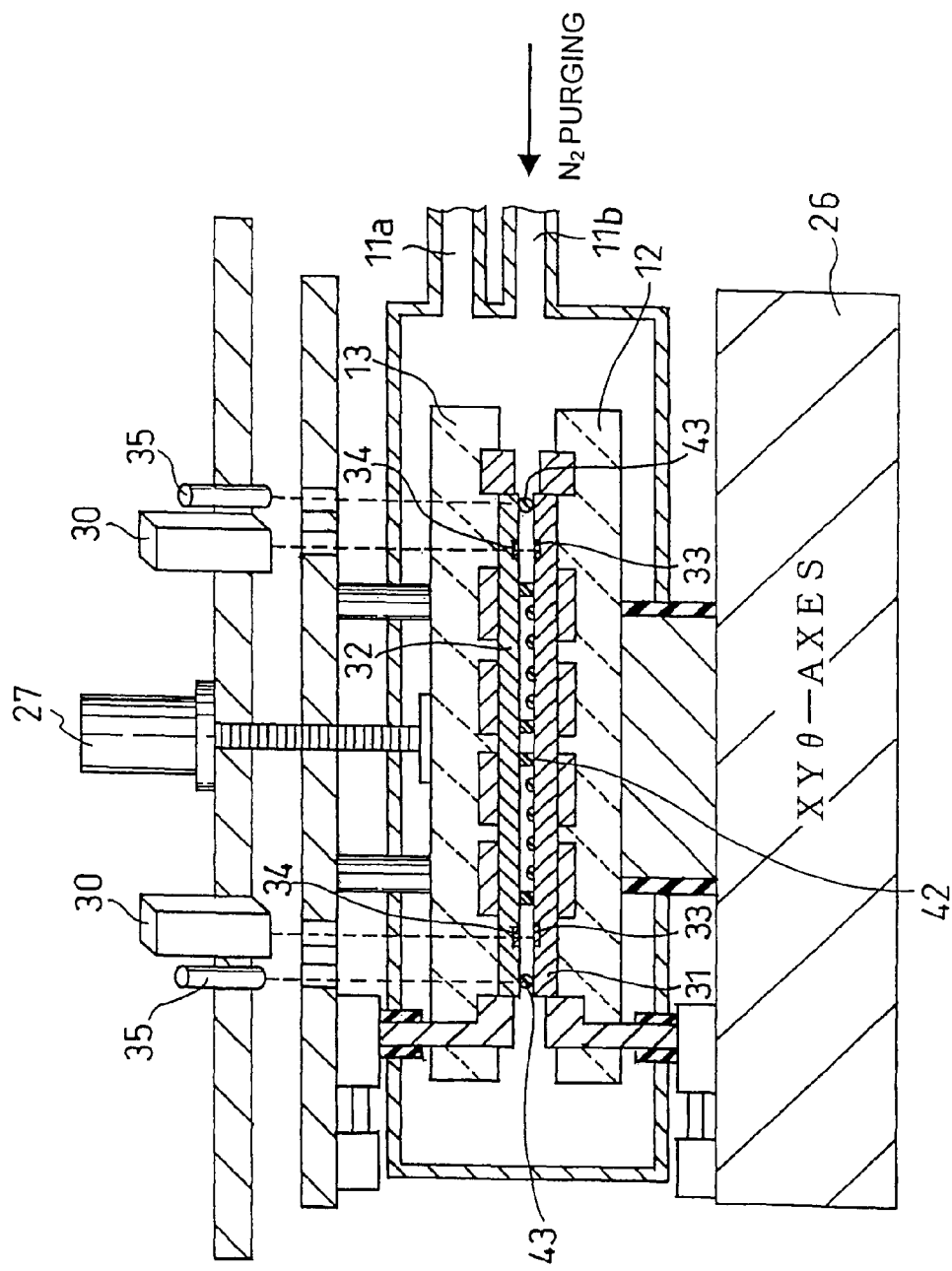
FIG. 11 shows the next operation of the operation shown in FIG. 10.

Subsequently, as shown in FIG. 11, the positions of the alignment marks 33 and 34 are detected while pressing the second surface plate 13 and the first surface plate 12 each other by the pressing motor 27, and the position of the first surface plate 12 is adjusted by the position-adjusting table 26 such that the misalignment thereof is, for example, within 1.0 μm. And, the resultant amount of pressing is, for example, 1960 N, and the gap between the first substrate 31 and the second substrate 32 in this state is almost equal to the diameter of the granular gapping material dispersed in the sealing material 42, i.e., about 5 μm. Thereafter, in the state that the pressure of, for example, 1960 N is applied, the photo-curable resin 43 applied around the sealing material 42 is cured temporarily by irradiating ultraviolet rays from the ultraviolet rays source 35.

Also, it is preferred that constraint force by the fixing guides and the pusher guides can constrain the misalignment of substrates by at least the amount equivalent to the weight by the pressing motor 27, for example, the thrust of about 1960 N in case where the weight by the pressing motor 27 is 1960 N although it depends on friction coefficient between the substrate and the surface plate.

In the conventional apparatus, in case of performing a position adjustment while pressing the second surface plate 13 and the first surface plate 12 each other, the force for restricting the movement of the substrates 31 and 32 in the direction parallel to the surface thereof is only the friction force proportional to drag acted on the surface plate from the substrate. In this regard, in the present embodiment, the movement of the substrates 31 and 32 in the direction parallel to the surface thereof is restricted even by restraint force by the fixing guide and the pusher guide during pressing the second surface plate 13 and the first surface plate 12 each other. Therefore, it was difficult to perform the alignment due to the misalignment of substrates in the conventional apparatus, however, according to this embodiment, it is possible to perform the alignment of substrates with much ease and in a short time.

Thereafter, as shown in FIG. 11, $N_2$ purging is performed by flowing in $N_2$ gas into the vacuum chamber 11 while slowly increasing the flow of $N_2$ gas from the vacuum exhaust opening 11b until the pressure of the vacuum chamber 11 becomes the atmospheric pressure. In case of applying the atmospheric pressure suddenly, great impact force is acted on the sealing material 42 and the like in an instant, however, the impact force on the sealing material 42 and the like can be prevented in case of slowly flowing in $N_2$ gas as such. Such purging method is, for example, referred to as "slow vent". The flow change of $N_2$ gas in this slow vent may be changed in a linear proportional function, quadratic function, or in stages, but not limited to this.

Figure 12:
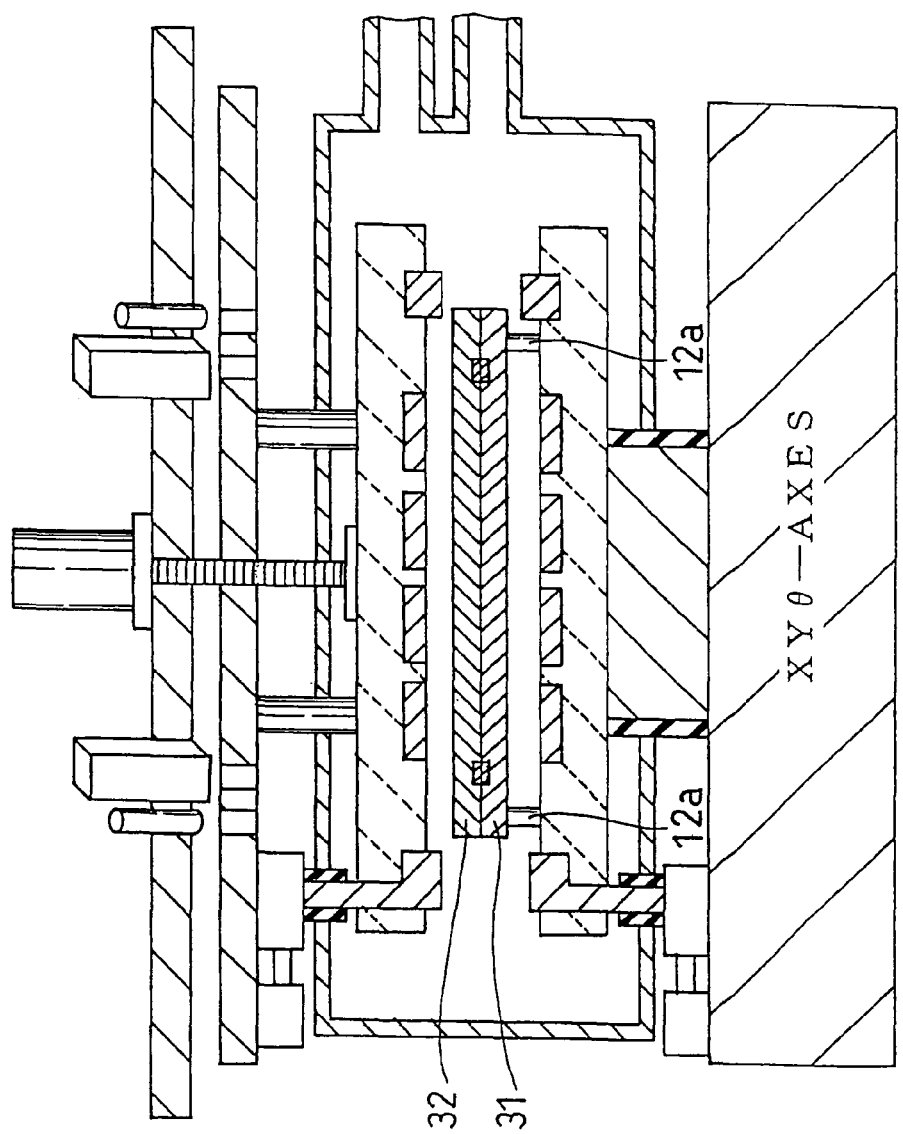
FIG. 12 shows the next operation of the operation shown in FIG. 11.

And, as shown in FIG. 12, the bonded substrates 31 and 32 are raised by the pushing-up pin 12a, and the shutter 6a is opened, and the substrates 31 and 32 are picked up by the substrate-carrying robot 9. Subsequently, the shutter 7a is opened, and after transferring the substrates 31 and 32 in the UV irradiation unit 7, the shutter 7a is closed. And then, the sealing material 42 is heated to be cured. At this time, it is preferred to use a mask for protecting the TFT from ultraviolet rays because the TFT may be damaged by ultraviolet rays.

According to the present embodiment described above, since the last position alignment (a fine adjustment) of the first substrate 31 and the second substrate 32 is performed while pressing the first surface plate 12 and the second surface plate 13 each other, the gapping material in the sealing material 42 rolls during the alignment. At this time, since the width of the sealing material 42 is about 1 mm and the height thereof is about 5 μm, the rolling of the gapping material will not be returned although the press is released thereafter. In addition, since the photo-curable resin 43 applied around the sealing material 42 is cured temporarily in the pressing state, the misalignment between the first substrate 31 and the second substrate 32 is prevented. Therefore, because the substrates are subject to the atmospheric press as the state that the alignment is performed, very high precision is maintained.

Also, during this fine adjustment, since the first substrate 31 and the second substrate 32 are restrained by the fixing guides 16 and the like, and the pusher guides 18 and the like in the direction parallel to the surface thereof, it is prevented that the substrates are displaced from the surface plates during the alignment although great force is applied from the pressing motor 27. Therefore, it is possible to perform the alignment with much ease and high precision.

When it is possible to perform the alignment with very high precision as described above, the inconsistencies of display and color are further reduced.

What is claimed is:

1. A method of manufacturing a liquid crystal display constituted by bonding first and second substrates, said method comprising the steps of:
    dropping a liquid crystal on said first substrate;
    performing an alignment between said first and second substrates while pressing said second substrate on a surface of said first substrate on which said liquid crystal is dropped with a predetermined pressure in a vacuum chamber where the internal pressure is below a predetermined value; and
    releasing said vacuum chamber into atmospheric pressure, wherein,
    said alignment between said first and second substrates comprises sliding said first substrate in an axial direction parallel to the surface of the first substrate.

2. The method of manufacturing a liquid crystal display according to claim 1, further comprising the step of fixing each of said first and second substrates on first and second surface plates by first and second supporter for restraining the displacement in the surface direction, before performing the alignment between said first and second substrates.

3. The method of manufacturing a liquid crystal display according to claim 2, wherein
    said first surface plate has a first substrate sucker sucking said first substrate, and
    said second surface plate has a second substrate sucker sucking said second substrate.

4. The method of manufacturing a liquid crystal display according to claim 3, wherein
    fixing said first substrate on said first surface plate by said first supporter comprises the step of squeezing two sides of said first substrate perpendicular to each other on each plane of first and second fixing members, said first fixing member being fixed on a surface of said first surface plate on which said first substrate sucker is provided and having said plane vertical to the surface, and said second fixing member being fixed on a surface of said first surface plate on which said first substrate sucker is provided and having said plane vertical to the surface of said first surface plate and said plane of said first fixing member, and
    fixing said second substrate on said second surface plate by said second supporter comprises the step of squeezing two sides of said second substrate perpendicular to each other on each of said planes of third and fourth fixing members, said third fixing member being fixed on a surface of said second surface plate on which said second substrate sucker is provided and having said plane vertical to the surface, and said fourth fixing member being fixed on a surface of said second surface plate on which said second substrate sucker is provided and having said plane vertical to the surface of said second surface plate and said plane of said third fixing member.

5. The method of manufacturing a liquid crystal display according to claim 1, further comprising the step of performing an electrostatic suction of said first and second substrates on said first and second surface plates, respectively, after dropping said liquid crystal.

6. The method of manufacturing a liquid crystal display according to claim 1, further comprising the steps of:
    dropping a photo-curable resin on said first substrate after dropping said liquid crystal; and
    irradiating ultraviolet rays to said photo-curable resin with the state of pressing said second substrate on said first substrate.

7. The method of claim 1, wherein, said alignment between said first and second substrates comprising sliding said first substrate in two axial directions parallel to the surface of the first substrate.

8. A method of manufacturing a liquid crystal display constituted by bonding first and second substrates, said method comprising the steps of:
    dropping a liquid crystal on said first substrate;
    applying a photocurable resin on said first substrate;
    performing an alignment between said first and second substrates by sliding said first substrate in two axial directions parallel to a surface of the first substrate and in a circumferential direction having an axis vertical to said surface as a rotating axis, in a vacuum chamber where the internal pressure is below a predetermined value, while pressing said second substrate on the surface of said first substrate on which said liquid crystal is dropped with a predetermined pressure;
    irradiating ultraviolet rays to said photo-curable resin in the state that said first and second substrates are press-welded; and
    releasing said vacuum chamber into atmospheric pressure.

9. A method of manufacturing a liquid crystal display constituted by bonding first and second substrates, said method comprising the steps of:
    dropping a liquid crystal on said first substrate;
    performing an alignment between said first and second substrates while pressing said second substrate on a surface of said first substrate on which said liquid crystal is dropped with a predetermined pressure in a vacuum chamber where the internal pressure is below a predetermined value;
    releasing said vacuum chamber into atmospheric pressure; and
    fixing each of said first and second substrates on first and second surface plates by first and second supporter for restraining the displacement in the surface direction, before performing the alignment between said first and second substrates.

10. The method of manufacturing a liquid crystal display according to claim 9, wherein
    said first surface plate has a first substrate sucker sucking said first substrate, and
    said second surface plate has a second substrate sucker sucking said second substrate.

11. The method of manufacturing a liquid crystal display according to claim 10, wherein fixing said first substrate on said first surface plate by said first supporter comprises the step of squeezing two sides of said first substrate perpendicular to each other on each plane of first and second fixing members, said first fixing member being fixed on a surface of said first surface plate on which said first substrate sucker is provided and having said plane vertical to the surface, and said second fixing member being fixed on a surface of said first surface plate on which said first substrate sucker is provided and having said plane vertical to the surface of said first surface plate and said plane of said first fixing member, and fixing said second substrate on said second surface plate by said second supporter comprises the step of squeezing two sides of said second substrate perpendicular to each other on each of said planes of third and fourth fixing members, said third fixing member being fixed on a surface of said, second surface plate on which second substrate sucker is provided and having said plane vertical to the surface, and said fourth fixing member being fixed on a surface of said second surface plate on which said second substrate sucker is provided and having said plane vertical to the surface of said second surface plate and said plane of said third fixing member.

12. The method of manufacturing a liquid crystal display according to claim 9, further comprising the step of performing an electrostatic suction of said first and second substrates on said first and second surface plates, respectively, after dropping said liquid crystal.

13. A method of manufacturing a liquid crystal display constituted by bonding first and second substrates, said method comprising the steps of:

dropping a liquid crystal on said first substrate;

performing an alignment between said first and second substrates, by sliding said first substrate in a circumferential direction having an axis vertical, to a surface of the first substrate as a rotating axis, while pressing said second substrate on the surface of said first substrate on which said liquid crystal is dropped with a predetermined pressure in a vacuum chamber where the internal pressure is below a predetermined value; and releasing said vacuum chamber into atmospheric pressure.

* * * * *